United States Patent Office 3,358,024
Patented Dec. 12, 1967

3,358,024
N-ALKYLCYCLOHEXYL 1,3-PROPANEDIAMINES
Ernest L. Yeakey and George P. Speranza, Austin, Tex., assignors to Jefferson Chemical Company, Inc., Houston, Tex., a corporation of Delaware
No Drawing. Filed Nov. 9, 1964, Ser. No. 409,935
5 Claims. (Cl. 260—563)

ABSTRACT OF THE DISCLOSURE

N-alkylcyclohexyl-1,3-propanediamines having the formula:

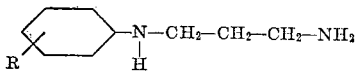

are prepared by a two-step process which comprises the reaction of acrylonitrile with an alkylcyclohexylamine followed by hydrogenation of the resulting alkylcyclohexylaminopropionitrile to the desired propanediamine. These amines are useful as corrosion inhibitors, asphalt additives and surface active agents.

---

This invention is concerned with a new type of substituted 1,3-propanediamines and to a method for their preparation. More particularly, this invention is concerned with N-alkylcyclohexyl-1,3-propanediamines.

The N-alkylcyclohexyl-1,3-propanediamines of the present invention are prepared by a two-step process which comprises the reaction of acrylonitrile with an alkylcyclohexylamine followed by hydrogenation of the resulting alkylcyclohexylaminopropionitrile to the desired propanediamine. These amines are useful as corrosion inhibitors, asphalt additives and surface-active agents. These novel propanediamines have the formula:

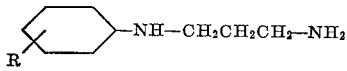

wherein R is an alkyl group containing from about 3 to about 14 carbon atoms. This alkyl group may be a straight-chain, branched chain or cycloalkyl group and may be attached at any ring position other than the number one position. A mixture of isomers may be used. The 4-isomer usually predominates in such mixtures. The preferred products are those in which the alkyl group is butyl, octyl, nonyl or dodecyl.

The first step in the preparation of the novel propanediamines of the present invention involves the reaction of acrylonitrile with an alkylcyclohexylamine having the formula:

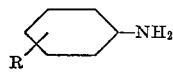

wherein R is an alkyl group having from about 3 to about 14 carbon atoms. The alkylcyclohexylamine starting material may be one prepared, for example, by the method disclosed in United States Patent 3,087,966. Acrylonitrile reacts readily with an amine group so that no catalyst is necessary for this reaction. The reaction may be conducted at a temperature within the range of about 0° to about 150° C., the preferred temperature range being from about 20° to about 70° C. The reaction is preferably conducted in the presence of a polar solvent that is inert under the reaction conditions employed. A preferred class of solvents is the lower aliphatic alcohols such as, for example, methanol, ethanol, isopropanol, and butanol. Other solvents that may be used include dioxane and glycol ethers such as ethylene glycol monomethyl ether, diethylene glycol monomethyl ether, ethylene glycol monoethyl ether, etc. The mol ratio of acrylonitrile to amine should be maintained within the range of about 0.9 to 1.1. The preferred mol ratio is within the range of 1 to 1.1.

The product obtained from the reaction of acrylonitrile with the alkylcyclohexylamine is an alkylcyclohexylaminopropionitrile having the formula:

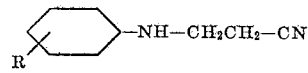

In the second step of our process this substituted propionitrile is hydrogenated at a temperature within the range of about 100° to about 200° C. and a hydrogen pressure within the range of about 500 to about 5,000 p.s.i.g. This hydrogenation step is conducted in the presence of a metallic hydrogenation catalyst of the type well known to those skilled in the art. Examples of metallic catalysts are those of platinum, palladium, nickel, zinc, copper, cobalt, chromium and molybdenum. These catalysts may be unsupported or supported on such carriers as activated charcoal, silica gel, alumina or kieselguhr. The preferred catalysts are those comprising nickel or cobalt.

The hydrogenation may be conducted in a batch or continuous manner all in accordance with known hydrogenation procedures. The hydrogenation step is preferably conducted in the presence of from about two to about eight mols of ammonia per mol of nitrile. It is also preferred that the hydrogenation be conducted in the presence of an inert solvent such as, for example, the lower aliphatic alcohols that are useful in the preparation of the nitrile. The other solvents that may be used in the addition of acrylonitrile may also be used in the hydrogenation step. In a preferred embodiment of the invention, the crude reaction mixture from the reaction of acrylonitrile with the alkylcyclohexylamine is hydrogenated without an intermediate purification step.

Following completion of the hydrogenation step the catalyst is removed by filtration, the solvent is removed by flashing and the product is purified by known procedures, such as, for example, by distillation.

The invention will be further illustrated by the following specific examples which are in no way intended to place limitations upon the invention.

Example I

To a mixture of 572 grams (2.0 mols) of dodecylcyclohexylamine and 678 grams of isopropanol was slowly added 106 grams (2.0 mols) of acrylonitrile. An exothermic reaction occurred and a reaction temperature of 30° to 50° C. was maintained for two hours. The mixture thus obtained was placed in a one-gallon stirred autoclave with 136 grams of ammonia and 100 grams of a nickel-copper-chromium hydrogenation catalyst. This mixture was heated at 110° to 120° C. under a hydrogen pressure of 3,000 p.s.i.g. until hydrogenation ceased. The catalyst was removed by filtration and the isopropanol solvent was removed by flashing. The remaining liquid was distilled to yield 307 grams of N-(dodecylcyclohexyl)-1,3-propanediamine which was a water insoluble, viscous liquid boiling at 195° to 203° C. at 1 mm. pressure.

Example II

To a mixture of 1,631 grams (7.0 mols) of nonylcyclohexylamine and 2,002 grams of isopropanol was slowly added 371 grams (7.0 mols) of acrylonitrile. The reaction temperature increased from 30° to 42° C. during the addition of the acrylonitrile. After stirring overnight, this mixture was placed in a three-gallon stirred autoclave with 357 grams of ammonia and 300 grams of a nickel-copper-chromium hydrogenation catalyst. The mixture was heated at a temperature of 110° to 115° C. under a hydrogen pressure of 3,000 p.s.i.g. until hydrogenation ceased. After removal of the catalyst by filtration, the isopropanol was flashed off. The remaining liquid was distilled to yield 1,016 grams of N-(nonylcyclohexyl)-1,3-propanediamine which had a boiling point of 166° to 185° C. at 2 mm. pressure.

*Example III*

Acrylonitrile (29 grams, 0.54 mol) was added slowly to a mixture of butylcyclohexylamine (84 grams, 0.54 mol) and methanol (113 grams). After stirring overnight at ambient temperatures, the mixture was placed in a one-liter stirred autoclave with ammonia (35 grams) and a nickel-copper-chromium hydrogenation catalyst (25 grams). The mixture was heated to a temperature of 110° to 115° C. under a hydrogen pressure of 3,000 p.s.i.g. until hydrogenation ceased. The catalyst was removed by filtration, the methanol was stripped off and the remaining liquid was distilled to yield 67 grams of N-(butylcyclohexyl)-1,3-propanediamine which had a boiling point of 110° to 112° C. at 1 mm. pressure.

Having thus described our invention, we claim:

1. An N-(alkylcyclohexyl)-1,3-propanediamine having the formula:

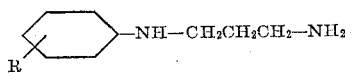

wherein R is an alkyl group containing from 3 to about 14 carbon atoms.
2. N-(nonylcyclohexyl)-1,3-propanediamine.
3. N-(octylcyclohexyl)-1,3-propanediamine.
4. N-(dodecylcyclohexyl)-1,3-propanediamine.
5. N-(butylcyclohexyl)-1,3-propanediamine.

References Cited

UNITED STATES PATENTS 1,992,615   2/1935   Hoffmann et al. ____ 260—583

OTHER REFERENCES

Adams et al., Organic Reaction, 1949, page 82.

CHARLES B. PARKER, *Primary Examiner.*

N. WICZER, P. C. IVES, *Assistant Examiners.*